(12) United States Patent
VanBlon et al.

(10) Patent No.: US 11,076,100 B2
(45) Date of Patent: Jul. 27, 2021

(54) DISPLAYING IMAGES ON A SMARTGLASSES DEVICE BASED ON IMAGE DATA RECEIVED FROM EXTERNAL CAMERA

(71) Applicant: Lenovo (Singapore) Pte. Ltd., Singapore (SG)

(72) Inventors: Russell S. VanBlon, Raleigh, NC (US); Robert J. Kapinos, Durham, NC (US); Timothy W. Kingsbury, Cary, NC (US); Scott W. Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 654 days.

(21) Appl. No.: 15/476,043

(22) Filed: Mar. 31, 2017

(65) Prior Publication Data

US 2018/0288333 A1 Oct. 4, 2018

(51) Int. Cl.
*H04N 5/232* (2006.01)
*H04N 5/265* (2006.01)
*H04N 5/76* (2006.01)
*G06T 19/00* (2011.01)
*G02B 27/01* (2006.01)
*H04N 7/18* (2006.01)

(52) U.S. Cl.
CPC ....... *H04N 5/23293* (2013.01); *G06T 19/006* (2013.01); *H04N 5/265* (2013.01); *H04N 5/76* (2013.01); *H04N 7/183* (2013.01); *G02B 27/017* (2013.01); *G02B 2027/014* (2013.01); *G02B 2027/0138* (2013.01)

(58) Field of Classification Search
CPC .......... H04N 1/00307; H04N 1/00315; H04N 5/23296; H04N 5/2254; H04N 5/2252; G02B 2027/0178
USPC .......... 345/633; 348/659, 222.1; 349/13, 14
See application file for complete search history.

(56) References Cited

U.S. PATENT DOCUMENTS

| | | | | |
|---|---|---|---|---|
| 2008/0216171 A1* | 9/2008 | Sano | ......................... | H04L 9/32 726/19 |
| 2009/0207269 A1* | 8/2009 | Yoda | ....................... | G06T 11/60 348/222.1 |
| 2011/0157379 A1* | 6/2011 | Kimura | .............. | H04N 5/23248 348/208.2 |
| 2012/0218301 A1* | 8/2012 | Miller | .................. | G02B 27/017 345/633 |
| 2014/0139612 A1* | 5/2014 | Jeong | ..................... | H04N 7/147 348/14.07 |

* cited by examiner

*Primary Examiner* — Xi Wang
(74) *Attorney, Agent, or Firm* — VanLeeuwen & VanLeeuwen; Jason A. Friday (57) ABSTRACT

An approach is provided that receives, at a smartglasses device, a set of image data from a digital camera that is external to the smartglasses device. The approach further displays an image at the smartglasses based on the set of image data.

17 Claims, 5 Drawing Sheets

DISPLAYING IMAGES ON A SMARTGLASSES DEVICE BASED ON IMAGE DATA RECEIVED FROM EXTERNAL CAMERA

BACKGROUND

When taking a picture with a smart device, the user must look at the device screen to properly align the camera to the subjects. Users commonly look away while taking a photo or video in order to see the real life view, but this makes it difficult to point the camera correctly. It can also be difficult to hold the smart device steady while holding the device at the correct height in order for the photographer to be able to view it.

SUMMARY

An approach is provided that receives, at a smartglasses device, a set of image data from a digital camera that is external to the smartglasses device. The approach further displays an image at the smartglasses based on the set of image data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

An approach is depicted in FIGS. 1-5 that shows a user viewing an image viewed from an external camera lens within the real life view of a holographic computer such as mixed reality smartglasses. This approach allows the user to hold the external camera closer to their body in a less awkward position, making it easier to hold the camera still. This approach can be applied while taking still photographs or videos. The approach describes three different embodiments ways of presenting the image data from the external digital camera to the smartglasses user.

A first embodiment is a "simple outline" embodiment. In this embodiment, the border or corners are shown in the smartglasses display to highlight where the smart device camera is pointing. This embodiments displays the real world as it exists through the smartglasses, with only the border of the digital image from the digital camera highlighted. In a further embodiment, when the digital camera is transmitting a digital image to the smartglasses, such as an image of a family posing for an outdoor portrait, the user (photographer) first looks through the smartglasses at the background without the subjects, in this case the family, present, and the smartglasses captures the image as it exists without the subjects present (e.g., the backdrop of the intended shot, etc.). When the subjects are positioned in front of the backdrop, the digital camera transmits the image from the camera's lens to the smartglasses. Image processing performed by the smartglasses notes the position of the subjects in front of the backdrop and highlights the position in the smartglasses display while, at the same time, the image processing process displays the backdrop to the user via the smartglasses display. The user sees the backdrop without the subjects with highlighting, such as a rectangle, border showing where the subjects are positioned, or other type of highlighting showing the position of the subjects. In this manner, the photographer can see the entire backdrop as it would appear without the subjects and how the subjects are positioned in front of the backdrop. If important backdrop elements, such as a landmark, are being blocked from the shot because they are currently behind the subjects, the photographer can move the subjects so that such important elements are included in the shot.

A second embodiment is an "augmented view finder" embodiment. In this embodiment, the approach displays the actual view finder from the digital camera on top of the real life view as seen by the photographer through the smartglasses display so that lighting, shadows, and other visual effects that may look different to the smart device camera than the user's eyes are highlighted. Alignment of the actual view is performed using the image processing, such as that described in the "simple outline embodiment," above. In this manner, the photographer can view the image as it will appear when taken by the digital camera rather than as it appears to the photographer's eyes through the smartglasses display.

With the first two embodiments, when the distance between the smartglasses display and the digital camera is increased, a buffer space or indicator could be shown to the user on the smartglasses display with the indicator sized so it accommodates for the different viewing angles between the smartglasses and the digital camera towards the subjects. If the viewing angles between the smartglasses display and the digital camera differ greatly, such as when the user leaves their camera on a tripod, it could automatically switch to "Picture-In-Picture (PIP)" mode, as described below.

A third embodiment is an "Picture-In-Picture (PIP)," embodiment. In this embodiment, the user can be looking in a different direction than the camera viewfinder or can be looking in a direction through the smartglasses display where only a subset of the digital camera. The digital camera viewfinder is displayed to the user as a picture-in-picture on the smartglasses display, since it would be impossible to show the viewfinder on top of the real life view as seen through the smartglasses display given the direction that the photographer is looking through the smartglasses. The PIP could be shown on a user-selectable corner of the smartglasses display, or on the side of the VR display closest to the direction where the camera is pointed relative to the user's view. In addition, the PIP can take up any portion, or all, of the area on the smartglasses display. The PIP can be semi-transparent so that the display from the digital camera's view finder does not block that portion of the user's view.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Logic as used herein include actions and self-contained sequence of actions to be performed by digital circuits characterized by the technology underlying its logic gates as well as by one or more processors programmed to execute instructions that perform such actions.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
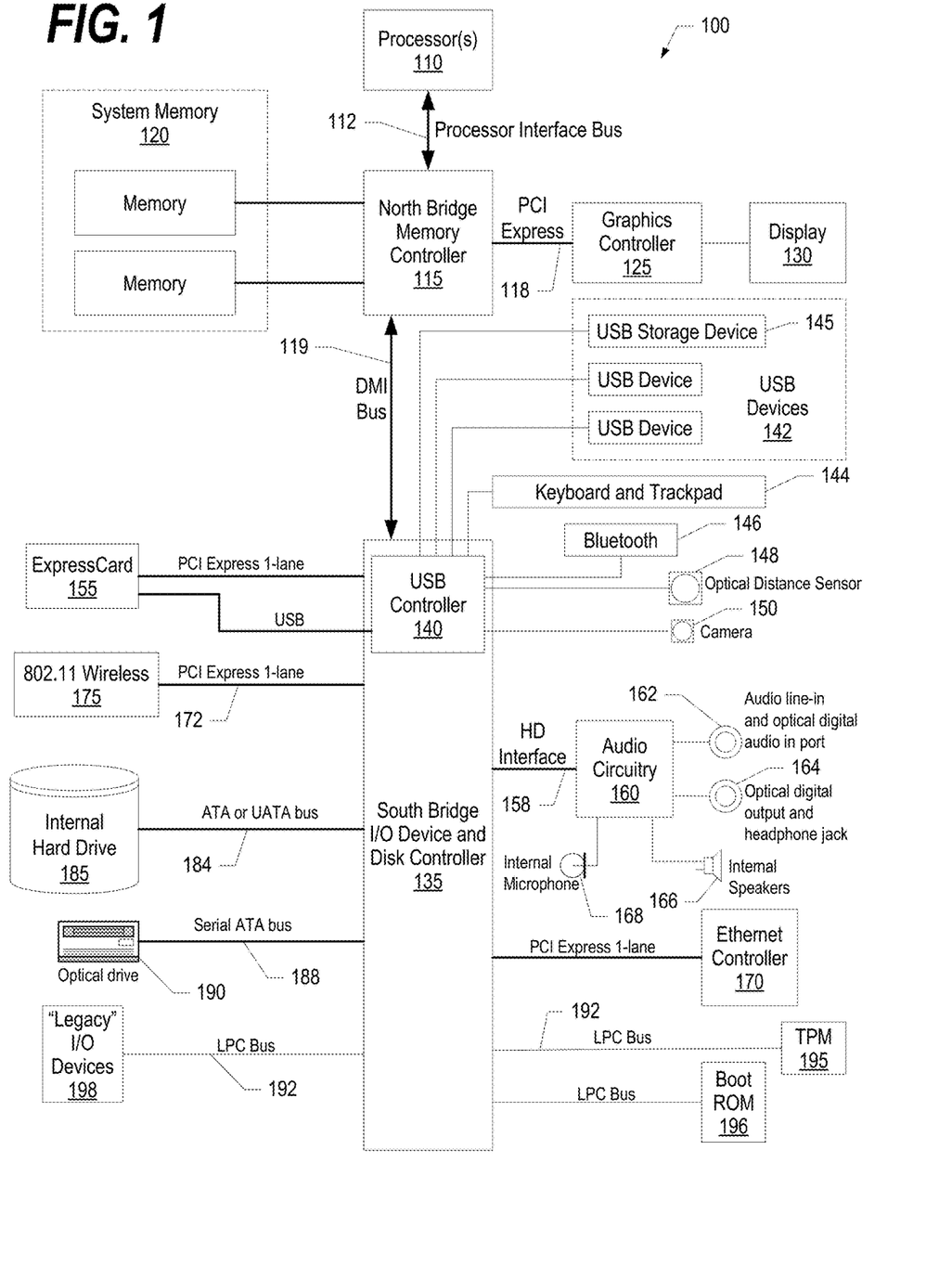
FIG. 1 is a block diagram of a data processing system in which the methods described herein can be implemented.
Figure 2:
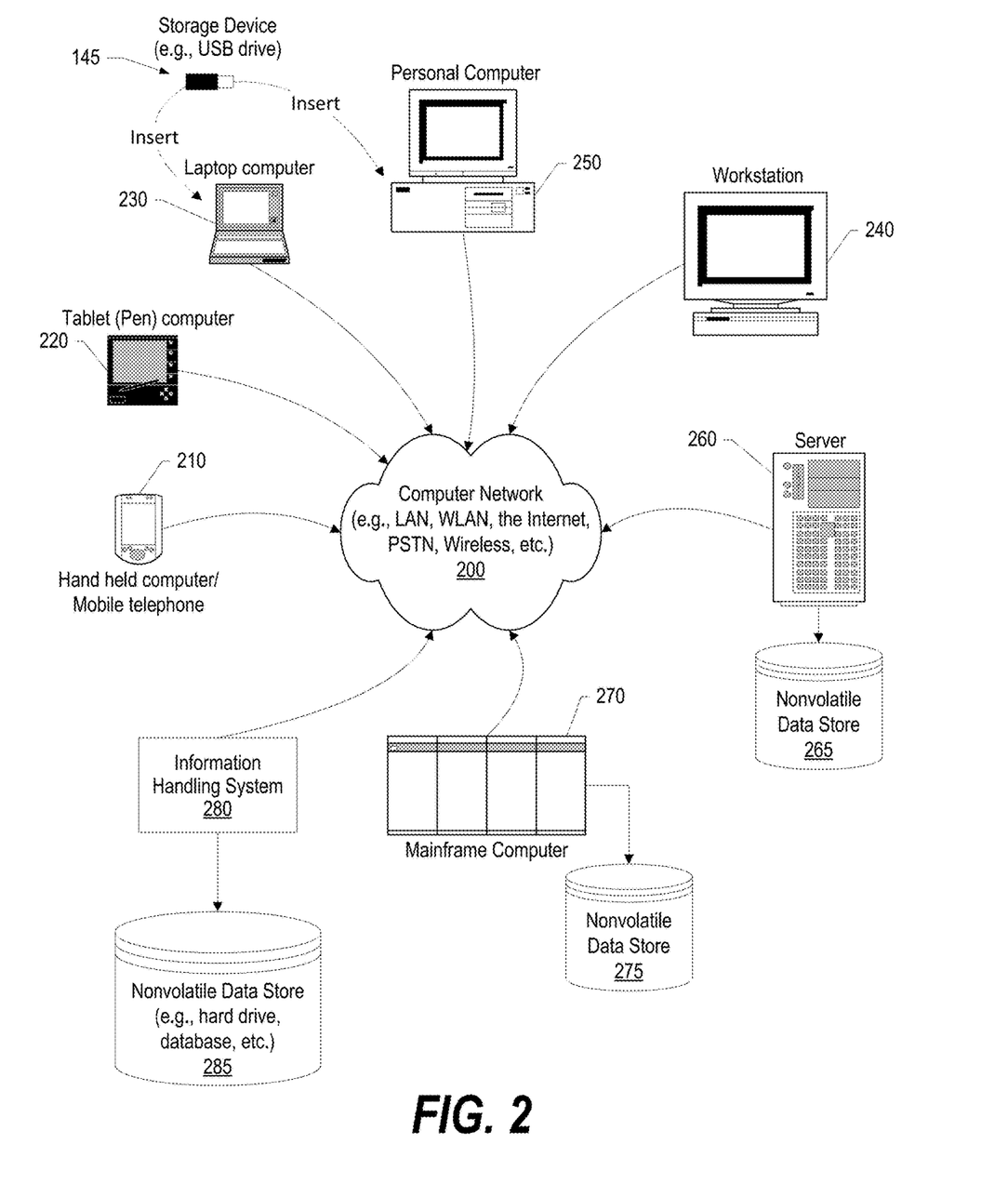
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include digital camera 150, optical distance sensor 148, keyboard and trackpad 144, and Bluetooth device 146, which provides for wireless personal area networks (PANs). Optical distance sensor 148 can detect the distance from a device to various objects, such as users of the system, while digital camera 150 can be used to capture images of objects, such as users of the system, to enable recognition software, such as facial recognition software, to identify the users of the system. USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
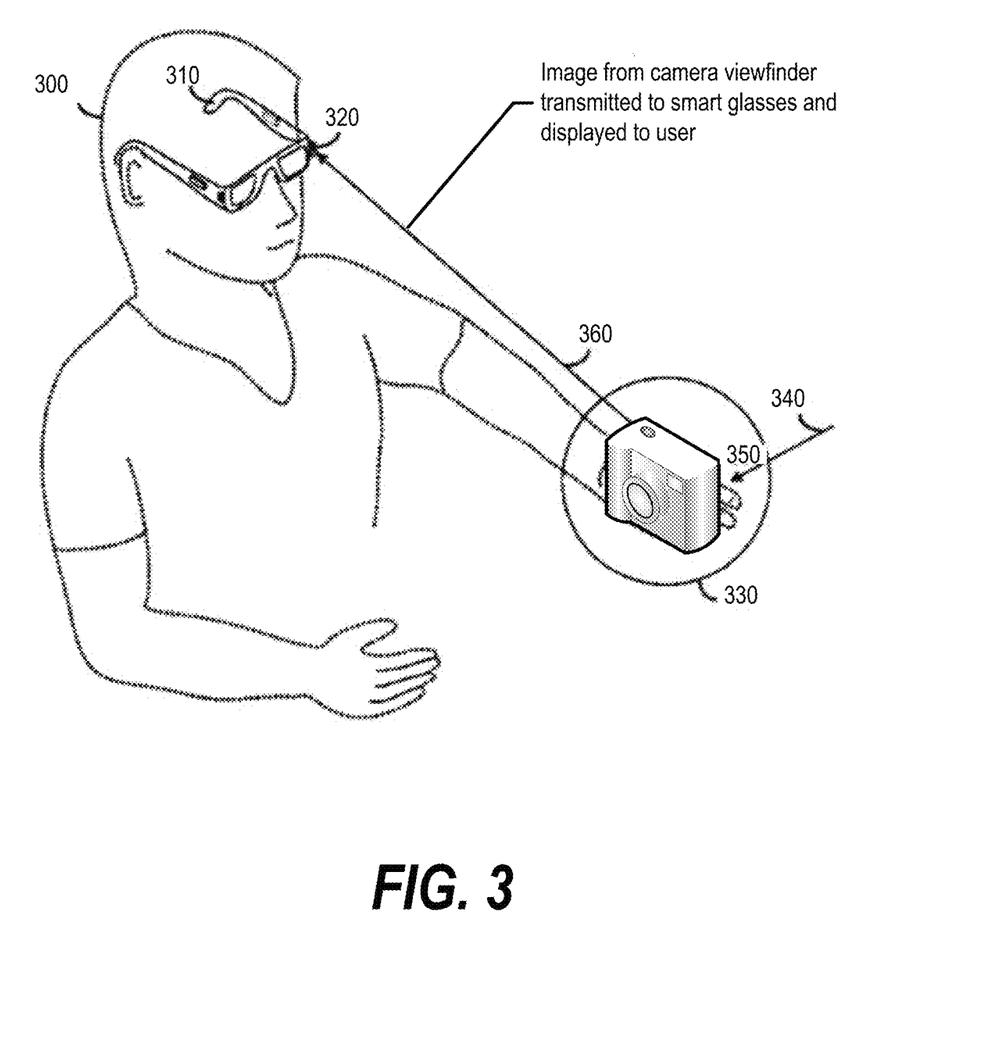
FIG. 3 is a diagram depicting use of smartglasses by a user to augment a view seen from a digital camera.

FIG. 3 is a diagram depicting use of smartglasses by a user to augment a view seen from a digital camera. Smartglasses 310 are a head-mounted display unit connected to an adjustable, cushioned inner headband, which can tilt smartglasses 310 up and down, as well as forward and backward. To wear the unit, the user fits smartglasses 310 on their head. In one embodiment, an adjustment wheel at the back of the headband is used to secure it around the crown, supporting and distributing the weight of the unit equally for comfort, before tilting the visor towards the front of the eyes. In the front of the smartglasses are sensors and related hardware, including cameras and processors. The visor is a transparent display onto which images can be displayed augmenting the view that the user sees through the display (visor). In one embodiment, the display, or visor, is tinted. When no images are displayed on the transparent display, the display is clear and the user can view the environment through the transparent display without any augmentation (the view might be somewhat darkened in the case of a tinted embodiment, similar to wearing sunglasses). Enclosed in the visor piece is a pair of transparent combiner lenses included in the transparent display, in which the projected images are displayed in the inside of the display. Smartglasses 310 can be calibrated to the interpupillary distance (IPD), or accustomed vision of the user. In one embodiment, along the bottom edges of the side, located near the user's ears, are a pair of small, red 3D audio speakers. The speakers, competing against typical sound systems, do not obstruct external sounds, allowing the user to hear virtual sounds, along with the sounds found in the environment. In one embodiment, using head-related transfer functions, smartglasses 310 generate binaural audio, which can simulate spatial effects; meaning the user, virtually, can perceive and locate a sound, as though it is coming from a virtual pinpoint or location. Also, in one embodiment, on the smartglasses, such as on a top edge, are two pairs of buttons that control display brightness buttons (e.g., above the left ear), and volume buttons (e.g., above the right ear). Additionally, in one embodiment, adjacent buttons can be shaped differently (e.g., one concave, one convex, etc.) so that the user can distinguish them by touch. In one embodiment, a power button and a row of small individual LED nodes, used to indicate system status, as well as for power management, indicating battery level and setting power/standby mode appear on the frame of the smartglasses. In one embodiment, wireless receiver 320 is included in the smartglasses device to receive data transmitted wirelessly from an external device, such as from external digital camera 330. Other ports and jacks may also be included on the frame or arms of the smartglasses device.

In FIG. 3, user 300 is wearing smartglasses device 310 and looking through transparent displays that are included in the storage device. The user is holding digital camera 330 that is oriented in a different direction from that of the smartglasses device. Image data captured at digital camera 330 through lens and viewfinder 340 are wirelessly transmitted to receiver 320 included in the smartglasses device. An image appears on the transparent display of the smartglasses that depicts the objects that appear through lens/viewfinder 340. When the user wishes to take the picture, the user simply presses button 350 on digital camera 330. "Image" or "images," as used herein, can be single images (e.g., "snapshots," etc.) or series of images (e.g., "video," etc.). As used herein, "image data," includes the digital data pertaining to the photographed image as well as other metadata, such as coordinate data and vector data pertaining to the image being taken.

Figure 4:
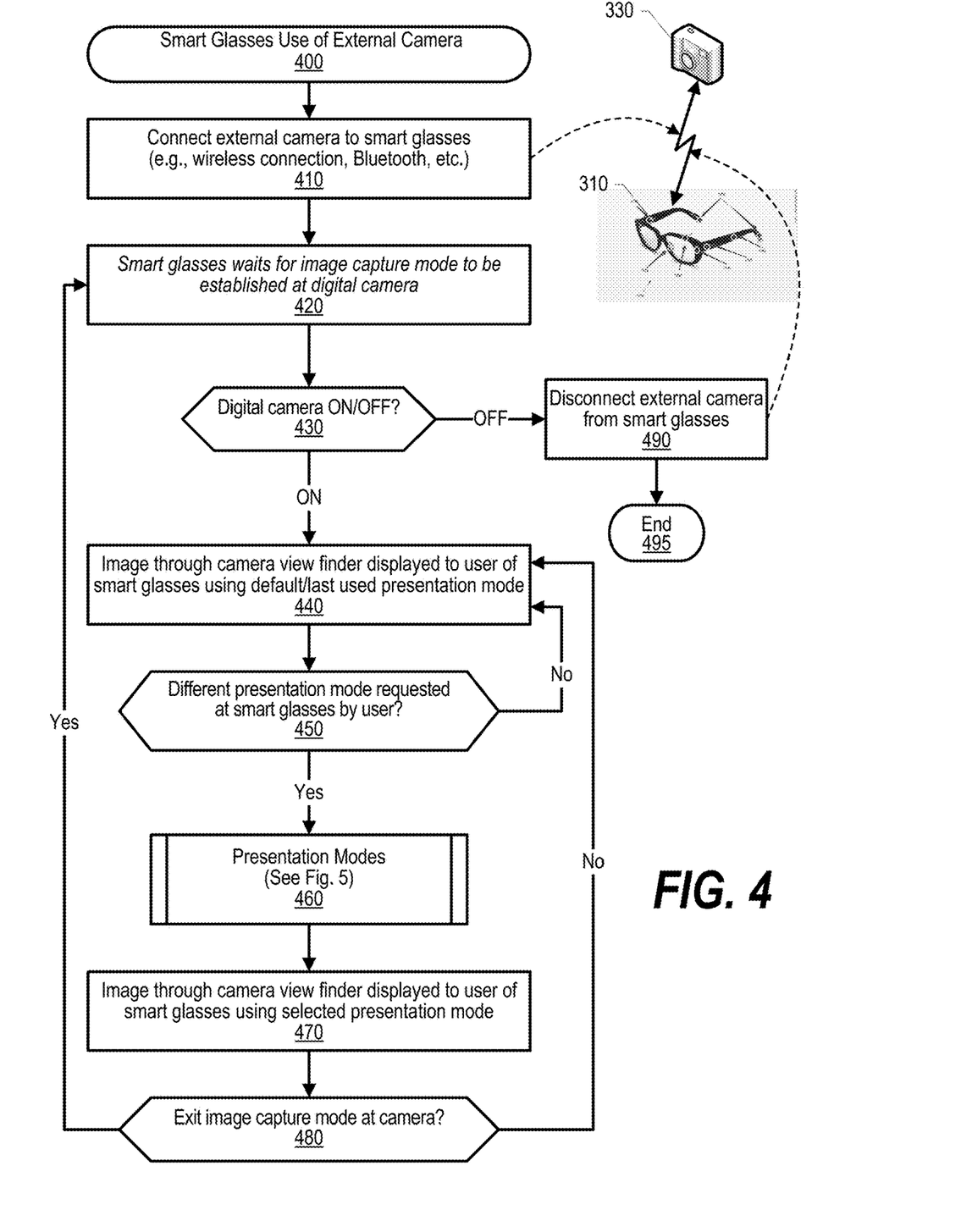
FIG. 4 is a flowchart showing steps performed to use smartglasses to augment a view seen from a lens of a digital camera by a user, such as a photographer.

FIG. 4 is a flowchart showing steps performed to use smartglasses to augment a view seen from a lens of a digital camera by a user, such as a photographer. FIG. 4 processing commences at 400 and shows the steps taken by a process that executes on smartglasses 310 when a user is using external digital camera 330. At step 410, the process running on the smartglasses device connects external digital camera 330 to smartglasses 310 via a wireless connection such as a Bluetooth connection, a WiFi connection, etc. At step 420, the process running on the smartglasses device waits for an image capture mode to be established at digital camera, such as the external camera switching into video mode or single picture mode, or having the external digital camera being turned off (which exits the process).

The process running on the smartglasses device determines whether the digital camera has been turned OFF (decision 430). If digital camera is still ON, then decision 430 branches to the 'ON' branch to perform steps 440 through 480. On the other hand, when the digital camera is turned OFF, then decision 430 branches to the 'OFF' branch to perform steps 490 and 495. When the digital camera is ON and the user has selected an image capture mode (e.g., video mode, single picture mode, etc.) then, steps 440 through 480 are performed. At step 440, the process running on the smartglasses device displays an image based on image data captured through the digital camera view finder and this image is displayed to the user of the smartglasses using the default or last used presentation mode that was set at the smartglasses device. The process running on the smartglasses device determines whether a different presentation mode has been requested at the smartglasses by the user (decision 450). If a different presentation mode has been requested, then decision 450 branches to the 'yes' branch whereupon steps 460 through 480 are performed. On the other hand, if a different presentation mode has not been requested, then decision 450 branches to the 'no' branch which continues to loop back to step 450 to display the augmented display at the transparent display of the smartglasses with the image being displayed based on the image data collected by the external digital camera.

When a different presentation mode has been requested by the user, then steps 460 through 480 are performed at the smartglasses device. At predefined process 460, the process running on the smartglasses device performs the Presentation Modes routine (see FIG. 5 and corresponding text for processing details). At step 470, the process running on the smartglasses device displays an image based on image data captured through the digital camera view finder and this image is displayed to the user of the smartglasses using the presentation mode that was set at the smartglasses device during the execution of predefined process 460.

The process running on the smartglasses device determines whether the user has exited image capture mode at the camera based on signals received from the digital camera at the smartglasses device (decision 480). If the user has exited image capture mode at the camera, then decision 480 branches to the 'yes' branch which loops back to step 420 to identify the image capture mode set at the digital camera or determine if the digital camera has been turned OFF. On the other hand, if the user has not exited image capture mode at the camera, then decision 480 branches to the 'no' branch which loops back to step 440. When the digital camera has been turned off then, at step 490, the process running on the smartglasses device disconnects external camera 330 from smartglasses device 310. FIG. 4 processing thereafter ends at 495.

Figure 5:
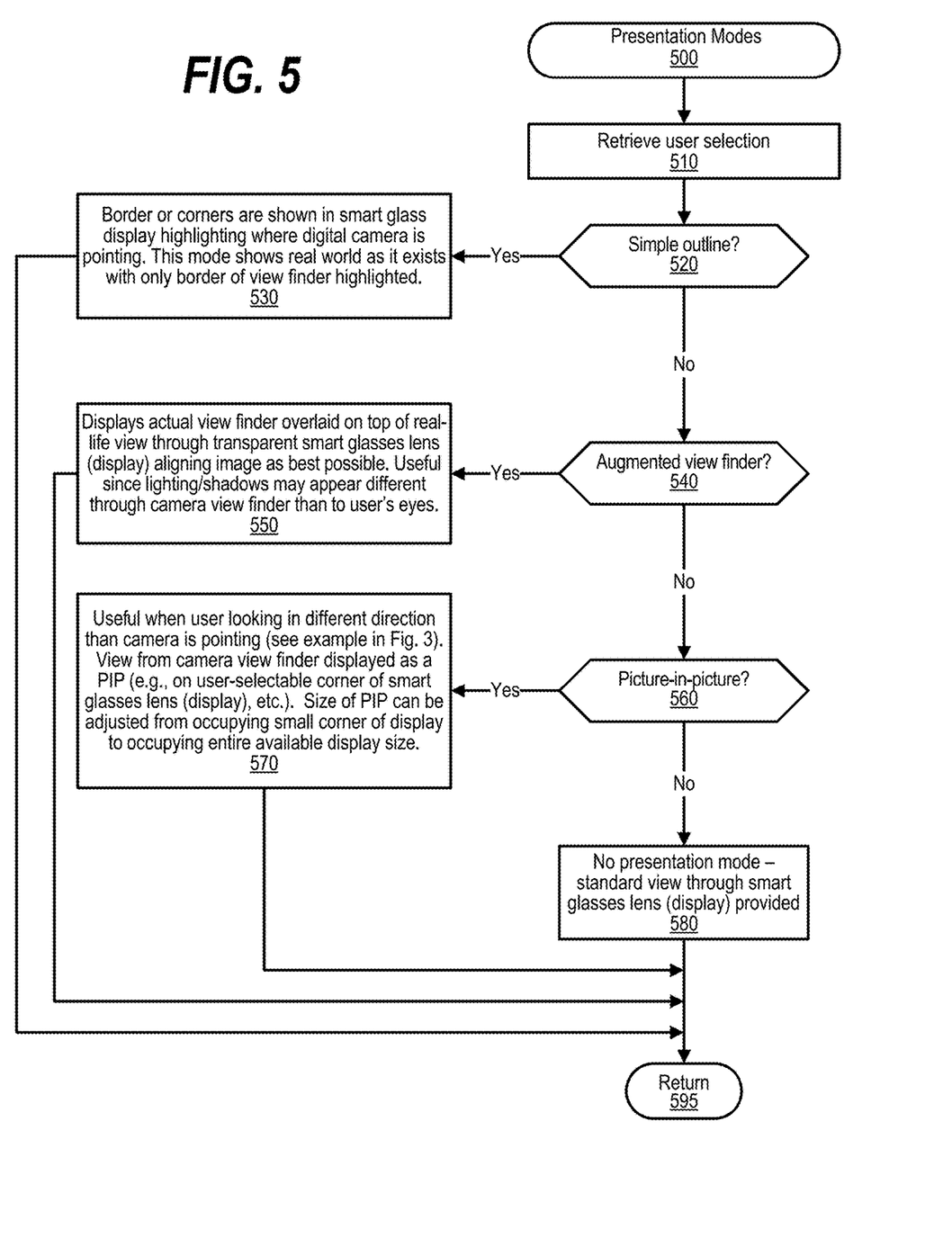
FIG. 5 is a flowchart showing steps performed to apply different presentation modes to the display of the smartglasses that will be seen by the user, such as a photographer.

FIG. 5 is a flowchart showing steps performed to apply different presentation modes to the display of the smartglasses that will be seen by the user, such as a photographer. FIG. 5 processing commences at 500 and shows the steps taken by a process that sets the presentation mode used at the smartglasses device. At step 510, the process retrieves user selection of a presentation mode to use at the smartglasses device. The process determines as to whether the user's selection is for a "simple outline" mode (decision 520). If the "simple outline" mode has been selected, then decision 520 branches to the 'yes' branch to perform step 530. On the other hand, if the "simple outline" mode was not selected, then decision 520 branches to the 'no' branch to continue processing the user's selection. At step 530, the process displays borders or corners are shown in smart glass display highlighting where digital camera is pointing. This mode shows the real world as it exists with only border of view finder highlighted. The process determines as to whether the user's selection is for an "augmented view" mode (decision 540).

In "simple outline" mode, the border or corners are shown in the smartglasses display to highlight where the smart device camera is pointing. This embodiments displays the real world as it exists through the smartglasses, with only the border of the digital image from the digital camera highlighted. In a further embodiment, when the digital camera is transmitting a digital image to the smartglasses, such as an image of a family posing for an outdoor portrait, the user (photographer) first looks through the smartglasses at the background without the subjects, in this case the family, present, and the smartglasses captures the image as it exists without the subjects present (e.g., the backdrop of the intended shot, etc.). When the subjects are positioned in front of the backdrop, the digital camera transmits the image from the camera's lens to the smartglasses. Image processing performed by the smartglasses notes the position of the subjects in front of the backdrop and highlights the position in the smartglasses display while, at the same time, the image processing process displays the backdrop to the user via the smartglasses display. The user sees the backdrop without the subjects with highlighting, such as a rectangle, border showing where the subjects are positioned, or other type of highlighting showing the position of the subjects. In this manner, the photographer can see the entire backdrop as it would appear without the subjects and how the subjects are positioned in front of the backdrop. If important backdrop elements, such as a landmark, are being blocked from the shot because they are currently behind the subjects, the photographer can move the subjects so that such important elements are included in the shot.

If the "augmented view" mode was selected, then decision 540 branches to the 'yes' branch. On the other hand, if the "augmented view" mode was not selected, then decision 540 branches to the 'no' branch to continue processing the user's selection. At step 550, the process displays actual view finder overlaid on top of real-life view through transparent smart glasses lens (display) aligning the images. This mode is useful when lighting and/or shadows appear differently through the camera view finder than to user's eyes.

In "augmented view" mode, the smartglasses displays the actual view finder from the digital camera on top of the real life view as seen by the photographer through the smartglasses display so that lighting, shadows, and other visual effects that may look different to the smart device camera than the user's eyes are highlighted. Alignment of the actual view is performed using the image processing, such as that described in the "simple outline embodiment," above. In this manner, the photographer can view the image as it will appear when taken by the digital camera rather than as it appears to the photographer's eyes through the smartglasses display.

In both "simple outline" and "augmented view" modes, when the distance between the smartglasses display and the digital camera is increased, a buffer space or indicator could be shown to the user on the smartglasses display with the indicator sized so it accommodates for the different viewing angles between the smartglasses and the digital camera towards the subjects. If the viewing angles between the smartglasses display and the digital camera differ greatly, such as when the user leaves their camera on a tripod, it could automatically switch to "Picture-In-Picture (PIP)" mode, as described below.

The process determines as to whether the user's selection is for a "picture-in-picture" mode (decision 560). If the "picture-in-picture" mode was selected then decision 560 branches to the 'yes' branch to perform step 570. On the other hand, if the "picture-in-picture" mode was not selected, then decision 560 branches to the 'no' branch to perform step 580. At step 570, the process displays a picture-in-picture (PIP) of the camera image data on the transparent display of the smartglasses. This mode is useful when the user is looking in different direction than camera is pointing (see example in FIG. 3). The view from the camera view finder is displayed as a PIP (e.g., on user-selectable corner of smart glasses lens (display), etc.). The size of the PIP can be adjusted from occupying a small corner of the smartglasses' transparent display to occupying the entire available display size.

In "Picture-In-Picture (PIP)," mode, the user can be looking in a different direction than the camera viewfinder or can be looking in a direction through the smartglasses display where only a subset of the digital camera. The digital camera viewfinder is displayed to the user as a picture-in-picture on the smartglasses display, since it would be impossible to show the viewfinder on top of the real life view as seen through the smartglasses display given the direction that the photographer is looking through the smartglasses. The PIP could be shown on a user-selectable corner of the smartglasses display, or on the side of the VR display closest to the direction where the camera is pointed relative to the user's view. In addition, the PIP can take up any portion, or all, of the area on the smartglasses display. The PIP can be semi-transparent so that the display from the digital camera's view finder does not block that portion of the user's view.

At step 580, when no presentation mode is selected, the process does not use a presentation mode allowing the user to view a standard view through smart glasses lens without augmentation of the image data from the digital camera. To return to a presentation mode, the user can select to execute this process again and select one of the three available presentation modes. FIG. 5 processing thereafter returns to the calling routine (see FIG. 4) at 595.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving, at a smartglasses device, a set of image data from a digital camera that is external to the smartglasses device;
   displaying an image at the smartglasses based on the set of image data;
   capturing, at the smartglasses device, a current view of a background;
   receiving the set of image data wherein the set of image data is one or more objects appearing in front of the background;
   generating the image by highlighting an area where the one or more objects appear; and
   displaying the image at the smartglasses where the background appears with the highlighting and without the one or more objects appearing on the image.

2. The method of claim 1 further comprising:
   receiving the set of image data wherein the set of image data is one or more objects; and
   combining a second set of image data captured at a second digital camera included in the smartglasses with the set of image data, wherein the combining creates the image that is displayed at the smartglasses.

3. The method of claim 1 further comprising:
   receiving the set of image data wherein the set of image data is a digital image; and
   displaying the digital image in a window appearing at a transparent display included in the smartglasses.

4. The method of claim 3 wherein the window appears as a picture-in-picture occupying a portion of the transparent display, and wherein a view through the transparent display occupies a remainder of the transparent display.

5. The method of claim 4 wherein the smartglasses are oriented in a different direction as the digital camera.

6. The method of claim 3 wherein the window occupies substantially an entire display area of the transparent display.

7. A smartglasses device comprising:
   one or more processors;
   a memory accessible by at least one of the processors;
   a transparent display capable of displaying images, wherein the display is accessible by at least one of the processors;
   a receiver, accessible by at least one of the processors, capable of receiving data from an external device; and
   a set of instructions stored in the memory and executable by at least one of the processors to:
      receive, at the receiver, a set of image data from a camera that is external to the smartglasses device;
      display, at the transparent display, an image that is based on the set of image data;
      capture, at the smartglasses device, a current view of a background;
      receive the set of image data wherein the set of image data is one or more objects appearing in front of the background;
      generate the image by highlighting an area where the one or more objects appear; and
      display the image at the smartglasses where the background appears with the highlighting and without the one or more objects appearing on the image.

8. The smartglasses device of claim 7 further comprising instructions stored in the memory and executable by at least one of the processors to:
   receive the set of image data wherein the set of image data is one or more objects; and
   combine a second set of image data captured at a second digital camera included in the smartglasses with the set of image data, wherein the combining creates the image that is displayed at the smartglasses.

9. The smartglasses device of claim 7 further comprising instructions stored in the memory and executable by at least one of the processors to:
   receive the set of image data wherein the set of image data is a digital image; and
   display the digital image in a window appearing at a transparent display included in the smartglasses.

10. The smartglasses device of claim 9 wherein the window appears as a picture-in-picture occupying a portion of the transparent display, and wherein a view through the transparent display occupies a remainder of the transparent display.

11. The smartglasses device of claim 10 wherein the smartglasses are oriented in a different direction as the digital camera.

12. The smartglasses device of claim 9 wherein the window occupies substantially an entire display area of the transparent display.

13. A computer program product comprising:
   a computer readable storage medium comprising a set of computer instructions, the computer instructions effective to:
      receive a set of image data from a camera that is external to the smartglasses device;
      display, at a transparent display, an image that is based on the set of image data;
      capture a current view of a background;
      receive the set of image data wherein the set of image data is one or more objects appearing in front of the background;
      generate the image by highlighting an area where the one or more objects appear; and display the image at the smartglasses where the background appears with the highlighting and without the one or more objects appearing on the image.

14. The computer program product of claim 13 wherein the actions further comprise:
   receive the set of image data wherein the set of image data is one or more objects; and
   combine a second set of image data captured at a second digital camera included in the smartglasses with the set of image data, wherein the combining creates the image that is displayed at the smartglasses.

15. The computer program product of claim 13 wherein the actions further comprise:
   receive the set of image data wherein the set of image data is a digital image; and
   display the digital image in a window appearing at a transparent display included in the smartglasses.

16. The computer program product of claim 15 wherein the window appears as a picture-in-picture occupying a portion of the transparent display, and wherein a view through the transparent display occupies a remainder of the transparent display.

17. The computer program product of claim 16 wherein the smartglasses are oriented in a different direction as the digital camera.

* * * * *